United States Patent [15] 3,645,752
Baxley [45] Feb. 29, 1972

[54] METHOD OF MAKING STABILIZED IMPREGNATED PEANUTS

[72] Inventor: James R. Baxley, Edenton, N.C.

[73] Assignee: Peanut Research & Testing Laboratories, Inc.

[22] Filed: Oct. 3, 1969

[21] Appl. No.: 863,712

[52] U.S. Cl. ...................................................99/126
[51] Int. Cl. ..................................................A23l 1/36
[58] Field of Search...................99/126, 127, 128, 163, 166

[56] References Cited

UNITED STATES PATENTS

| | | | |
|---|---|---|---|
| 3,294,549 | 12/1966 | Vix et al. | 99/126 |
| 3,457,087 | 7/1969 | Renner | 99/126 |
| 3,317,325 | 5/1967 | Dursy | 99/126 |
| 1,908,059 | 5/1933 | Sawin | 99/126 |
| 2,504,620 | 4/1950 | Avera | 99/128 |
| 2,447,387 | 8/1948 | Avera et al. | 99/128 |

OTHER PUBLICATIONS

Development & Potential of Partially Defatted Peanuts By Vix et al.; Reprint from Peanut Journ. & Nut World.
Low-Calorie Peanuts by Vix et al.; Reprint from 9/65 Food Processing/Marketing.

*Primary Examiner*—Frank W. Lutter
*Assistant Examiner*—Steven L. Weinstein
*Attorney*—Morse, Altman & Oates

[57] ABSTRACT

Highly stable, flavor impregnated peanuts are produced by first pressing out a substantial portion of the natural oil. The pressed, partially defatted peanuts are then oil roasted to reconstitute the nuts back to their original shape and size. After oil roasting, the nuts are drained and while still hot transferred to a second oil bath of a substantially lower temperature than the first. This quenches the roasting treatment and releases vacuum developed within the nut oil cells by the reconstitution process. In the second oil bath, the oil replaces the natural oil in the nut, the replacement oil preferably being of a high-stability type. Flavor impregnants may be included in the second oil bath, as desired.

3 Claims, No Drawings

METHOD OF MAKING STABILIZED IMPREGNATED PEANUTS

BACKGROUND OF THE INVENTION

1. Field of the Invention

This invention relates generally to partially defatted nuts and more particularly is directed towards a novel process for producing impregnated peanuts characterized by a long shelf life.

2. Description of the Prior Art

In U.S. Pat. Nos. 2,003,415 and 3,294,549 there are disclosed processes for reducing the calorie content of nuts by pressing the nuts under high pressure, typically by the use of a hydraulic press, so as to separate the oil from the nut meat without breaking the nut. The nut meats are then reconstituted to more or less their original size and shape primarily by applying steam to the nuts or immersing them in water. These processes are capable of removing up to 80 percent or so of the natural oil from the nuts and the resulting low calorie nut is a desirable item as a dietetic food product.

The reconstituted nuts, while desirable from a calorie standpoint, lack flavor as well as a long shelf life.

It is an object of the present invention to provide improvements in processing pressed nuts and more particularly it is an object of the invention to improve the flavor, texture and shelf life of partially defatted, pressed nuts. A further object of the invention is to provide an improved method for reconstituting partially defatted nuts and the product made thereby.

SUMMARY OF THE INVENTION

This invention features a novel process for reconstituting partially defatted nuts and includes the steps of subjecting pressed, partially defatted nuts to an oil bath at a temperature sufficient to roast the nuts, typically in the range of 300° to 350° F., wherein the nuts will return to their original size and shape. The nuts are then drained for a short period of time, such as 1 minute, and while still hot then subjected to a second oil bath in the temperature range of 130° to 140° F. The second bath will quench the roast treatment and fill the evacuated oil cells of the nut with the oil of the second bath. Flavor additives may be added to impregnate the reconstituted nuts. This invention also includes as a food product nuts having impregnated oil replacing the natural oil.

BRIEF DESCRIPTION OF THE PREFERRED EMBODIMENT

By way of introduction, the process of producing partially defatted nuts as taught by the foregoing patents, consists essentially of three operations. These are (1) pressing, (2) reconstituting, and (3) drying and roasting. A bed of either raw nuts together with their skins or blanched nuts, typically is pressed in a hydraulic press to remove the desired amount of oil. This compresses and deforms the nuts without breaking them to any great extent. The pressed and misshapened nuts are then heated in boiling water to expand or restore them to their original size and shape. Salt and other ingredients are then added during the expansion step. The expanded nuts are then dried and roasted without oil. The reconstitution by immersion in boiling water generally produces a hard and chalky texture. Also nuts processed in this manner tend to become rancid within a very short time despite the addition of antioxidants and other preservatives.

During the roasting step of pressed, partially defatted peanuts, the nuts are reconstituted and expanded to their original shape and size. The reexpanded oil cells within the nuts, now partially empty of their original oil content, are at a negative pressure or vacuum at the roasting temperature. If the nuts are allowed to cool in air, the vacuum is released through the cell walls and air is forced in to occupy the cells with residual unexpressed oil. This intimate contact between air and peanut oil enables more rapid than normal oxidation of the oil.

If, however, the nuts are allowed to cool while immersed in an oil bath at a temperature substantially lower than the roasting temperature, the vacuum within the oil cells is released not by air but by the oil of the bath. The oil cells can thus be refilled with oil, the replacement oil portion being of optional choice. To obtain a maximum shelf life for the nuts, a high-stability oil is preferred. Since virtually any flavor can be incorporated into the oil, it is possible to impregnate peanuts with various flavors and at the same time impart extended stability to the nuts. By the use of appropriate flavoring, for example, it is possible to simulate the flavor of more expensive nuts such as pecans, almonds and walnuts or create completely new and different products with other flavors such as fruit.

The texture of the finished product can be varied from relatively soft to hard and crisp by the degree of heat treatment and through the choice of water blanched or abrasive blanched peanuts selected for pressing. Water blanched peanuts provide a texture that is crisper than abrasive blanched nuts and are ideal for preparing simulated almonds. Abrasive blanched peanuts are desired for simulating softer textured nuts such as pecans and walnuts.

Essentially, the process of this invention involves a two-stage oil bath treatment of the pressed peanuts. The first oil bath is heated to a temperature sufficiently hot to cause the rapid reconstitution or expansion of the nuts to their original size and shape. Temperatures of 300°–350° F., are preferred.

After the nuts are immersed in the first bath and have expanded and browned or roasted to the desired degree, they are removed from the first oil bath and drained for a short period, usually 1 minute. This first oil bath by its roasting and reconstituting action causes the internal oil cells to reform but, since the cells are empty of their natural oil they will be at a negative pressure or vacuum for a period of time.

The nuts, while still hot and while the oil cells are still evacuated, are next immersed in a second oil bath, the temperature of which is substantially lower than that of the first bath, with a temperature of 130°–140° F. being preferred. This second bath quenches the roast treatment and releases the vacuum within the oil cells of the peanuts, forcing in as a replacement the oil of the second bath. The nuts are allowed to remain in the second oil bath until they are saturated at which point they will cease to float and sink to the bottom of the oil bath. The warm nuts are then removed from the oil bath and allowed to drain. The nuts may then be cooled to room temperature by standard methods and packaged.

Having thus described the invention what I claim and desire to obtain by Letters Patent of the United States is:

1. The method of producing stabilized, impregnated nuts, comprising the steps of subjecting pressed and partially defatted nuts to a first bath of oil heated to a roasting temperature between 300°–340° F. for a time sufficient to roast said pressed nuts and reconstitute them to their original size and shape, and then subjecting the reconstituted nuts to a second bath of stabilized oil and a flavoring of a different nut type at a temperature between 130°–140° F. and for a time sufficient for the liquid of said second bath to saturate said nuts.

2. The method of claim 1 wherein the temperature of said first bath is between 330°–340° F.

3. The method of claim 1 plus the step of draining said nuts between said first and second baths.

* * * * *